(12) United States Patent
Ozcan

(10) Patent No.: US 9,845,792 B2
(45) Date of Patent: Dec. 19, 2017

(54) WIND TURBINE SYSTEM

(71) Applicant: Huseyin Ozcan, Houston, TX (US)

(72) Inventor: Huseyin Ozcan, Houston, TX (US)

(*) Notice: Subject to any disclaimer, the term of this patent is extended or adjusted under 35 U.S.C. 154(b) by 0 days.

(21) Appl. No.: 14/882,314

(22) Filed: Oct. 13, 2015

(65) Prior Publication Data

US 2017/0101982 A1    Apr. 13, 2017

(51) Int. Cl.
| | | |
|---|---|---|
| *F03D 80/80* | (2016.01) | |
| *F03D 13/20* | (2016.01) | |
| *F03D 1/06* | (2006.01) | |
| *F03D 7/02* | (2006.01) | |
| *F03D 9/00* | (2016.01) | |
| *E04H 12/18* | (2006.01) | |
| *E04H 12/08* | (2006.01) | |

(52) U.S. Cl.
CPC ............ *F03D 80/80* (2016.05); *E04H 12/08* (2013.01); *E04H 12/182* (2013.01); *F03D 1/0675* (2013.01); *F03D 7/0236* (2013.01); *F03D 9/002* (2013.01); *F03D 13/20* (2016.05)

(58) Field of Classification Search
CPC ..... E04H 12/08; E04H 12/182; F03D 1/0675; F03D 7/0236; F03D 9/002; F03D 13/20; F03D 80/80
See application file for complete search history.

(56) References Cited

U.S. PATENT DOCUMENTS

| | | | | |
|---|---|---|---|---|
| 2,454,058 A * | 11/1948 | Hays | ................... | F03D 9/17 290/4 D |
| 3,958,376 A * | 5/1976 | Campbell | ............. | E04H 12/182 182/69.4 |
| 4,040,217 A * | 8/1977 | Cloup | ..................... | E04H 12/34 52/115 |
| 5,333,422 A * | 8/1994 | Warren | ................. | E04H 12/182 52/115 |
| 6,320,273 B1 * | 11/2001 | Nemec | .................... | F03D 3/005 290/43 |
| 6,902,370 B2 * | 6/2005 | Dawson | ................ | F03D 7/0236 415/4.1 |
| 7,254,944 B1 * | 8/2007 | Goetzinger | ............... | F02C 6/16 290/55 |
| 8,661,744 B2 * | 3/2014 | Keller | .................. | E04H 12/182 343/883 |
| 8,959,870 B2 * | 2/2015 | Schmidt | ................ | E04H 12/182 52/115 |
| 2004/0169376 A1* | 9/2004 | Ruer | ...................... | E02D 27/42 290/55 |
| 2005/0005562 A1* | 1/2005 | Henderson | ............ | E04H 12/182 52/633 |

(Continued)

*Primary Examiner* — James Ference
(74) *Attorney, Agent, or Firm* — Delphine James

(57) ABSTRACT

The present invention is an improved arrangement for a wind turbine system wherein the power generator unit is independently installed at ground level to minimize the vertical compressive load imposed on the poles. The wind turbine system is powered by an integrated hydraulic power unit comprising a hydraulic pump driving a hydraulic motor operationally coupled to the power generator at ground level. A lighter weight hydraulic pump replacing the old system generator is operationally coupled to the wind turbine rotor blades disposed atop the pole. An umbilical hose supplies high pressurized fluid from the hydraulic pump to the hydraulic motor thereby causing the power generator to rotate.

11 Claims, 10 Drawing Sheets

(56) References Cited

U.S. PATENT DOCUMENTS

| | | | |
|---|---|---|---|
| 2006/0188371 A1* | 8/2006 | Christensen | F03B 3/00 416/147 |
| 2009/0230688 A1* | 9/2009 | Torres | F03D 15/00 290/55 |
| 2009/0285682 A1* | 11/2009 | Baker | F03D 1/0641 416/1 |
| 2010/0102557 A1* | 4/2010 | Ulanovskiy | E02D 27/42 290/44 |
| 2010/0270800 A1* | 10/2010 | Krietzman | H02P 9/04 290/44 |
| 2010/0320770 A1* | 12/2010 | Dahlhaug | F03D 15/00 290/55 |
| 2011/0000206 A1* | 1/2011 | Aprad | F02G 1/043 60/517 |
| 2012/0159875 A1* | 6/2012 | Meyer | E04H 12/182 52/115 |
| 2012/0189390 A1* | 7/2012 | Belinsky | F03D 1/001 405/204 |
| 2012/0255291 A1* | 10/2012 | Kameda | F03C 1/26 60/398 |
| 2012/0257970 A1* | 10/2012 | Akashi | F28D 1/022 416/95 |
| 2012/0308307 A1* | 12/2012 | Del Campo y Ruiz de Almodovar | E02B 17/021 405/196 |
| 2012/0308338 A1* | 12/2012 | von Ahn | B66C 1/108 414/10 |
| 2013/0284608 A1* | 10/2013 | Blake | F03D 1/04 205/464 |
| 2013/0336775 A1* | 12/2013 | Blake | F03D 1/025 415/207 |
| 2013/0341934 A1* | 12/2013 | Kawanishi | B60L 8/00 290/1 A |
| 2014/0023500 A1* | 1/2014 | Rubio | F03D 3/005 416/24 |
| 2014/0070534 A1* | 3/2014 | Hamano | F03D 11/026 290/43 |
| 2015/0060055 A1* | 3/2015 | Tolman | E21B 43/126 166/250.01 |
| 2015/0060083 A1* | 3/2015 | Romer | E21B 23/00 166/370 |

* cited by examiner

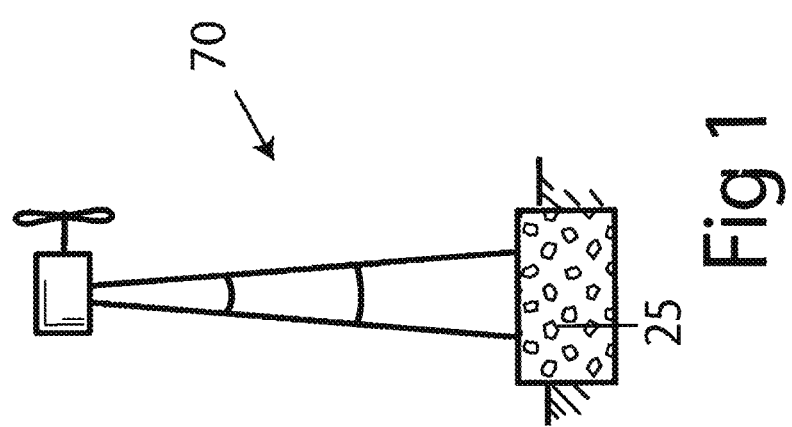

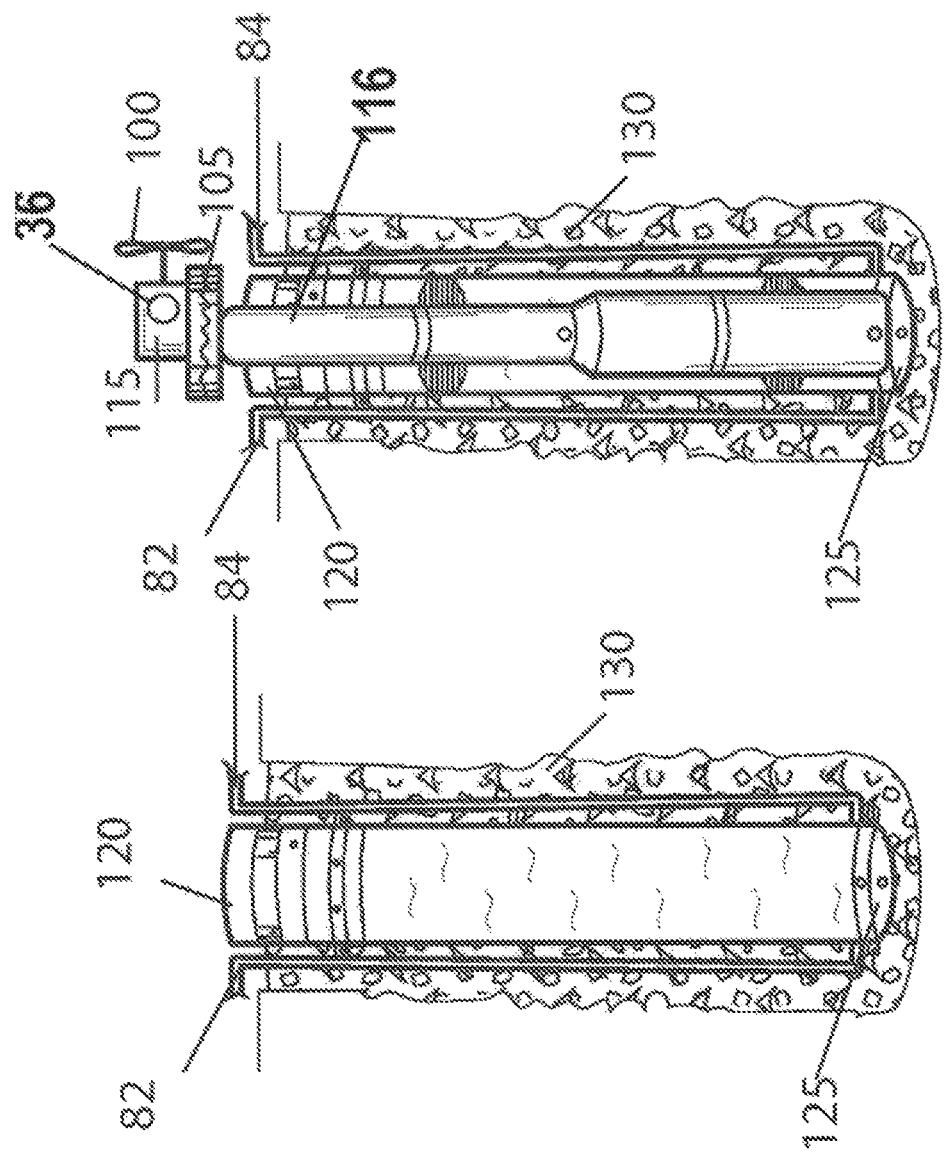

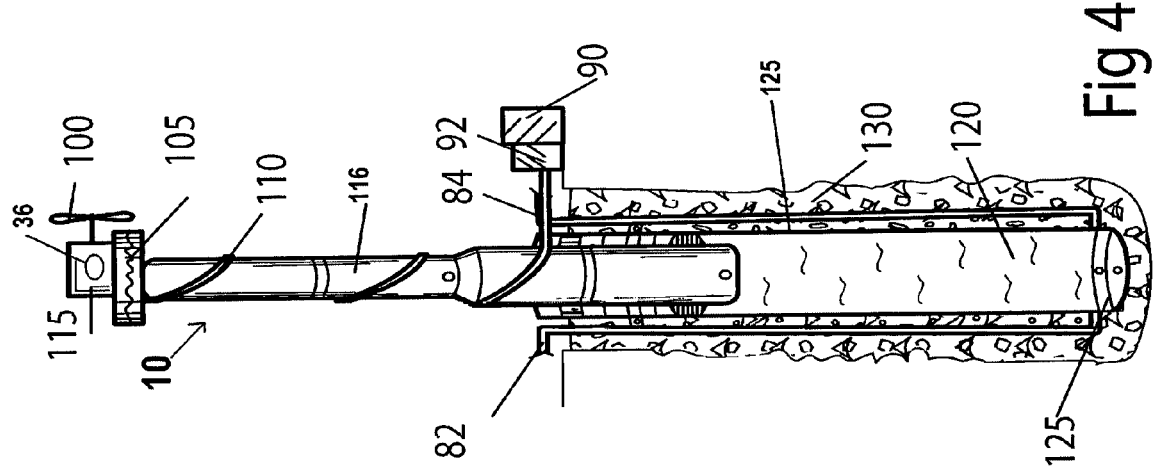

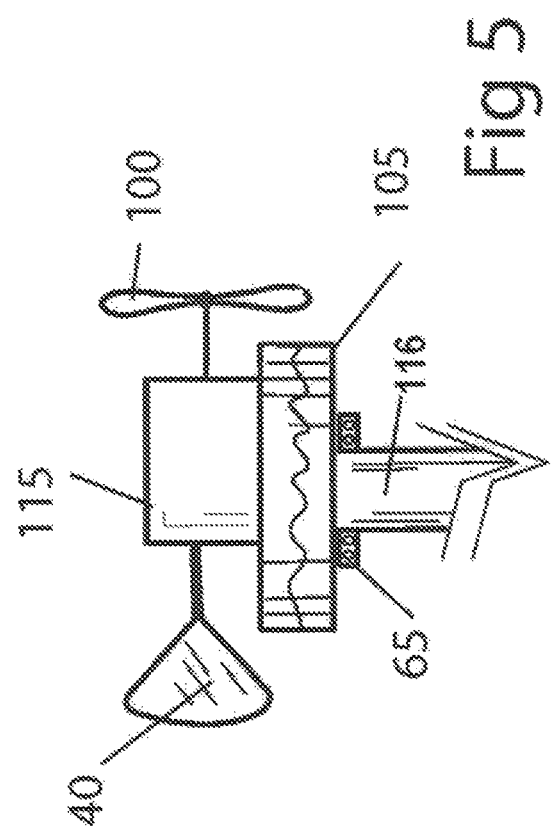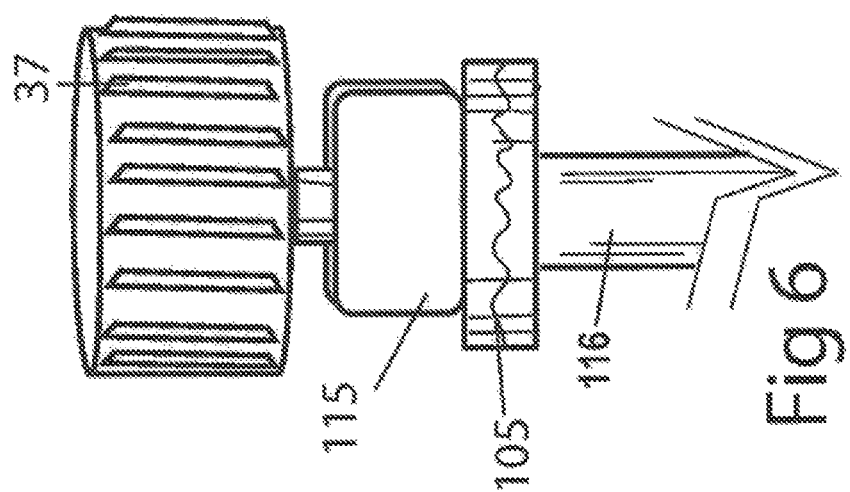

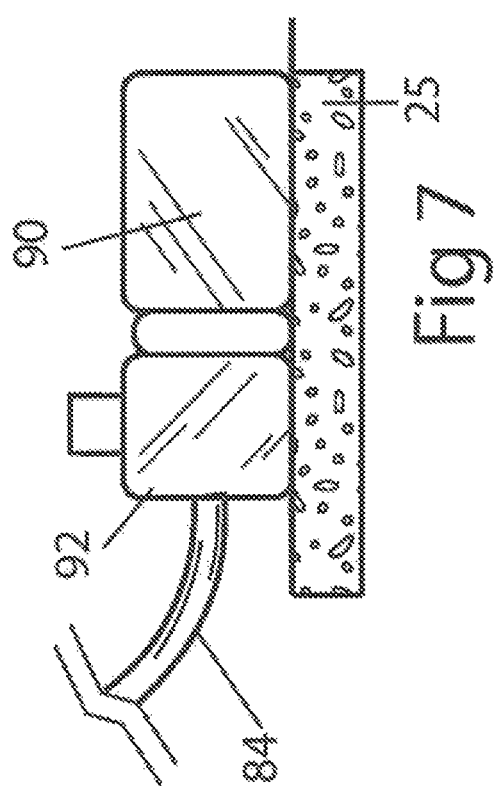

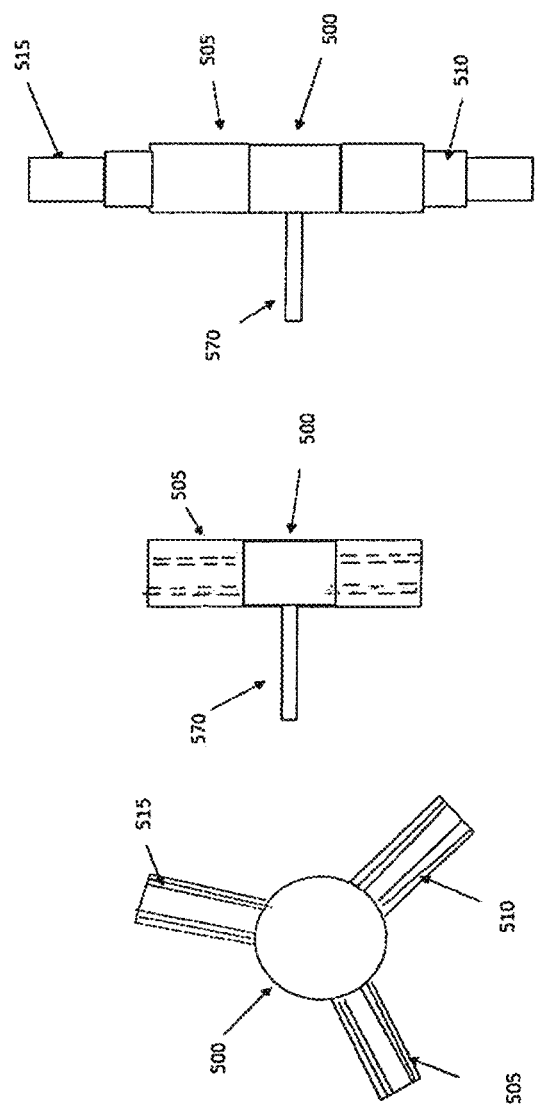

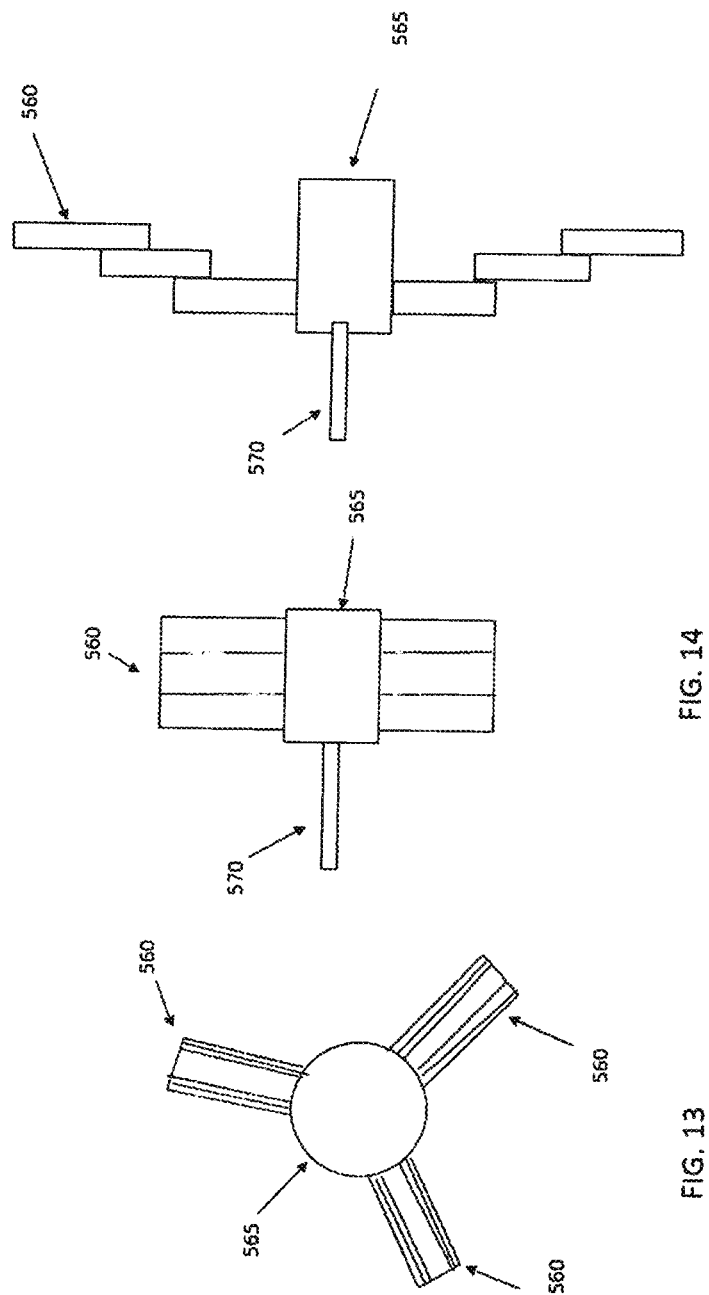

WIND TURBINE SYSTEM

This application claims the benefit of Provisional Application 62/122,527

BACKGROUND OF THE INVENTION

This invention relates to wind turbines more particularly an improved method of harnessing wind power thereby converting kinetic energy to generate electrical energy.

Windmills have been known and used for centuries as power generators and typically have been used to pump water and to grind grains such as wheat and corn. Because energy from the wind is free and non-polluting, much attention has been given to improving the efficiency and lowering the cost of windmill structures. Wind power has increased exponentially since the dawn of the 21st century. The amount of power that a conventional or propeller type windmill can generate is directly proportional to the square of the diameter of the circle of rotation of the blade tips and also to the cube of the wind velocity.

A wind turbine converts kinetic energy from the wind into electrical power. Generally, wind turbines have a main rotor shaft operationally coupled to an electrical power generator that sits atop a tower that is pointed into the direction of the wind. In one embodiment the horizontal-axis wind turbines (HAWT) have the main rotor shaft arranged horizontally. Conventional HAWTs wind turbines have three blades and are oriented or pointed into the wind by computer controlled motors. These turbines typically require a supporting tower ranging from 60 to 90 meters (200 to 300 feet) in height. The blades generally rotate at a rotational speed of about 10 to 22 rpm. A gear box is commonly used to step up the speed to drive the generator. In other embodiments the vertical-axis wind turbines (or VAWTs) have the main rotor shaft arranged vertically.

As wind blows past a turbine, the blades capture the energy and rotate. This rotation triggers an internal shaft to spin, which is connected to a gearbox increasing the speed of rotation, which connects to a generator that ultimately produces electricity. Most commonly, wind turbines consist of a steel tubular tower, of at least 100 feet, which supports both a "hub" securing wind turbine blades and the "nacelle" which houses the turbine's shaft, gearbox, generator and controls. A wind turbine is equipped with wind assessment equipment and will automatically rotate into the face of the wind, and angle or "pitch" its blades to optimize energy capture.

Although HAWTs have achieved widespread usage, their efficiency is not optimized. In particular, they will not exceed the Betz limit of 59.3% efficiency in capturing the potential energy of the wind passing through it. More energy can be collected by using a variable speed turbine and a solid state power converter to interface the turbine with the generator. It is desirable to provide a lighter structure to support HAWT or VAWT wind turbines to save on manufacturing and maintenance costs.

SUMMARY OF THE INVENTION

One of the main objectives of the present invention is to efficiently harness the wind's kinetic energy and convert it into electricity.

Another goal of the present invention is to decrease the initial capital investment required for manufacturing wind turbines Another object of the present invention is to decrease annual maintenance costs of wind turbines.

Another object is to provide a novel wind driven power generator which is compact in size with a modular construction.

Another object of the present invention is to provide a high power-to-weight ratio at relatively low cost and without sacrifice of structural integrity.

Another object of the present invention is to provide a wind turbine system wherein the power generator is installed at ground level.

The present invention is an improved arrangement for a wind turbine system wherein the power generator unit is independently installed at ground level to minimize the vertical compressive load imposed on the poles. The wind turbine system is powered by an integrated hydraulic power unit comprising a hydraulic pump driving a hydraulic motor operationally coupled to the power generator at ground level. A lighter weight hydraulic pump replacing the old system generator is operationally coupled to the wind turbine rotor blades disposed atop the pole. An umbilical hose supplies high pressurized fluid from the hydraulic pump to the hydraulic motor thereby causing the power generator to rotate.

The pole is constructed with smaller tapered threaded casing joints which are assembled joint by joint with its lower end disposed below ground level within a wellbore The pole includes wind breakers at certain intervals to reduce bending stress due to wind forces. The casing within the wellbore serves as a cylinder wherein the pole acts like a piston therein. The cylinder contains a lighter liquid causing the pole to submerge therein. By adding heavier liquid within casing the pole is raised above ground through hydraulic pressure.

The above and other objects, features and advantages of the present invention should become even more readily apparent to those skilled in the art upon a read in of the following detailed description in conjunction with the drawings wherein there is shown and described illustrative embodiments of the invention.

BRIEF DESCRIPTION OF DRAWINGS

These and other details of the present invention will be described in connection with the accompanying drawings, which are not furnished only by way of illustration and not in limitation of the invention.

FIG. 1 frontal view of the prior art a wind turbine system.

FIG. 2 is a side perspective view of the cemented wellbore of the wind turbine system of the present invention.

FIG. 3 is a side perspective view of the tower lowered within the wellbore of the wind turbine system of the present invention FIG. 4 is a side perspective view of the tower raised above ground level.

FIG. 5 is a frontal cutaway view of the compressor unit attached to HAWT disposed atop the tower.

FIG. 6 is a frontal cutaway view of the hydraulic pump unit attached to VAWT disposed atop the tower.

FIG. 7 is frontal cutaway view of the power generator at the ground level.

FIG. 11 illustrates an embodiment of the vertical blades collapsed.

FIG. 12 illustrates a side view of the vertical blades.

FIG. 12A illustrates an embodiment of the vertical blades extended.

FIG. 13 illustrates an embodiment of the lateral blades collapsed.

FIG. 14 illustrates a side view of the lateral blades.

FIG. 15 illustrates an embodiment of the lateral blades extended.

DETAILED DESCRIPTION OF THE INVENTION

Figure 9:
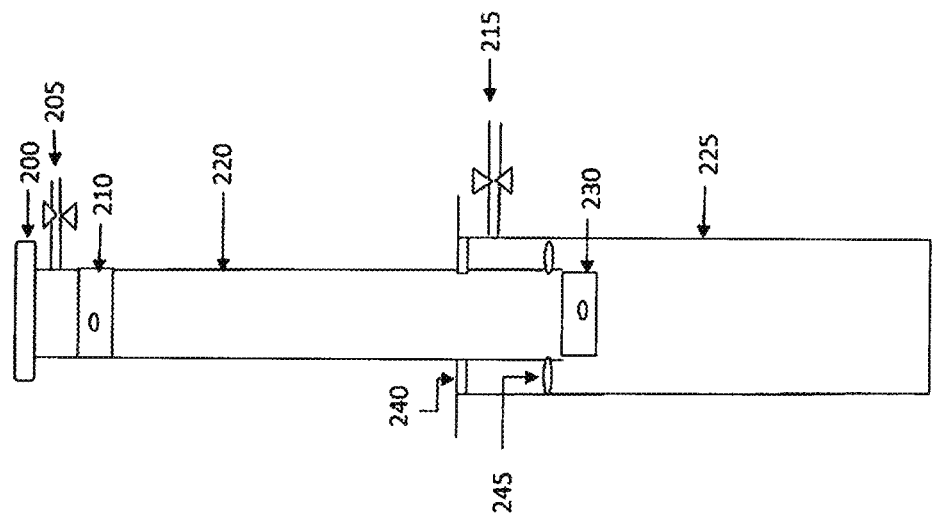
FIG. 9 illustrates the hydraulic system with floaters extended.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

As depicted in FIG. 3, the improved wind turbine system (10) of the present invention comprises a wind assembly (115) that drives a power generator assembly installed at ground level. As shown in FIG. 5, the wind turbine assembly comprises a pumping unit (36) operationally coupled to an impeller (100). As depicted the wind turbine assembly is supported by a tank (105) disposed atop a tower situated at an elevation level of at least 100 feet above ground level. In the present invention, the wind stream is collected by the wind turbine assembly (115) which is operationally coupled to a pumping unit supporting the conversion of the wind stream to kinetic energy that is transported to the power generator assembly installed at ground level thereby converting mechanical energy into the electricity by magnetic induction. In the present invention the power generator assembly (90, 92) comprises a motor (92) operationally coupled to a generator (90).

Power generator assembly (90, 92) can be manufactured from any suitable rigid material, including plastic, steel, carbon fiber, composites and other such combination of materials. The generator (90) is directly connected to a motor (92) drive shaft for rotation therewith.

A conventional nacelle is a cover housing that contains all of the generating components of a wind turbine situated atop the tower including the power generating assembly hardware. As depicted in the prior art in FIG. 1, the tower (70) supports the entire nacelle sitting above ground level. In the present invention the power generator assembly is installed at ground level thereby decreasing the load atop the tower.

As depicted in FIGS. 5 and 6, the rotor blades can be vertically mounted (37) or horizontally mounted (100). Wind support (40) allows the platform (60) to rotate 360 degrees about rotating mechanism (65) within the direction of the wind.

Wind can occur at high or variable low velocities, which produces a wind stream that drives the wind turbine assembly to transform wind energy into the mechanical energy which is transferred to hydraulic pump (115).

As depicted in FIG. 1, a conventional wind turbine system (70) normally has a tower platform which is supported by a plurality of horizontal and diagonal supports, disposed upon a cemented platform (25). As illustrated in FIG. 4, the present invention has a tower that comprises a hollow elongated cylindrical pipe (116) having a top end and a lower end defining the longitudinal axis of the tower and interconnecting the wind turbine assembly with the power generating assembly. Helical windbreakers can span the external surface of the elongated cylindrical pipe (116) thereby decreasing the vibrations of the tower (116) under stress of the wind.

As depicted, the wellbore is cased and cemented (120) near the ground level and extends vertically downward below ground level to support tower (116). The wellbore serves as a cylinder which acts like a piston for moving the tower (116) from an extended position to a lowered or retracted position within the wellbore. The tower is constructed with smaller sized tapered threaded casing joints to allow running into the cased wellbore with a rig.

The interior of the tower (116) through ports may be filled with a compressed fluid, such as air and/or hydraulic fluid to allow for stabilization of the tower when extended and retracted. Additionally the escape of the fluid controls the rate of descent of the tower (116) within the wellbore.

The tower (116) is closed at both ends to store both gas and liquid at high pressures. Gas and liquid pressure improves tower's rigidity, load capacity and its natural frequency. The ports allow air or inert gasses as well as liquid to be injected therein when assembled.

The loads and compressive stresses on the tower (116) structure are reduced due to fluid high pressure and increased tensile stress. In use, the tower (116) will be partially filled with non-corrosive liquid to dampen the natural frequency as needed.

As depicted in FIGS. 3 and 4, on the top of the tower (116) the old system generator is replaced with a wind turbine assembly (115) having a lighter pumping unit (36) therein. In this embodiment a hydraulic pumping unit (36) is illustrated. The pump (36) can be coupled via a hydraulic or an electric clutch and break system to the impeller (100). As impeller (100) rotates pumping unit (36) forces high pressured hydraulic fluid through an electro-hydraulic umbilical hose (110) which drives hydraulic motor (92) which is operationally coupled to power generator (90). As depicted hose (110) helically extends from top to lower end of tower (116). The umbilical hose (110) consists of additional electrical and hydraulic lines to control clutch and break system. As illustrated, the base of the pumping unit (105) can be a partially filled liquid tank which reduce vibrations or modify and minimize the natural frequency of the whole system.

As illustrated in FIG. 2, a pair of opposing parallel injection pipes (82, 84) extend linearly downward to the lower end of the wellbore. In use, injection pipes (82, 84) is used to fill the wellbore with a light liquid such as water as shown in FIG. 2 which allows tower (116) to be stored in a retracted position. However, as depicted in FIG. 4, when tower (116) is elevated, a heavier liquid such as mud is injected into the wellbore causing tower (116) to elevate above ground level.

In the prior art, rotational speed of the blades is varied based upon the wind speed. One of the main advantage of this system over the prior art is that power generator speed is controlled by hydraulic flow pressure and rate. There is no reduction in the rotational speed of the blades. The power generator speed is controlled at ground level.

With the present invention there several ways the hydraulic wind turbine system can be installed: (a) Wellbore embodiment illustrated in FIGS. 2, 3, and 4; (b) Tower floating embodiment illustrated in FIGS. 8 and 9; and (c) Rotating pipe embodiment illustrated in FIG. 10.

Depicted in FIGS. 2, 3, and 4 is one embodiment with an encased wellbore. In this embodiment, wellbore (130) is drilled using conventional drill bits. An external casing pipe (125) along with opposing circulation pipes (82 and 84) are inserted into the wellbore (130) and cemented therein. A well head, a blow out preventer or a casing stripper (120) is installed at the top of the external casing (125). To assemble tower (116) multiple sizes of connected casing joints are run into the external casing (125). The bottom end of the tower (116) is capped such that there is no fluid communication inside external casing (125). While installing tower (116) inside external casing (125) it may float therein. Thus, depending upon the density of the fluid inside the external casing (125) it may be necessary to keep injecting fluid into tower (116) adding some fluid into the tower to lower it to a desired depth within the external casing (125). Once the entire tower (116) is at its desired depth within the external casing (125), the required wind turbine assembly (115, 105, 100 and 110) are installed atop of the pole. As depicted in FIG. 3. Any wind direction adjustments are handled at the nacelle.

In operation, the blowout or casing striper (120) is closed on the tower (116) to allow fluid circulation inside the external casing (125). High density fluid is injected at the bottom of the external casing (125) through external small pipes (82 or 84). Light fluid is pumped out through the wellhead ports. The required upward force to raise the tower (116) is a function of fluid density difference between the inside and outside of the tower (116) as well as applied external pressure at the bottom of external casing (125). When the tower has reached to the desired elevation it is hung at wellhead using slips as depicted in FIG. 4. Fluid level inside the tower (116) can be adjusted by draining fluid from ports located on the tower (116). The tower (116) can be lowered to the bottom for servicing or maintenance by displacing or circulating out the heavy fluid inside the external casing (125) with a lighter fluid.

Figure 8:
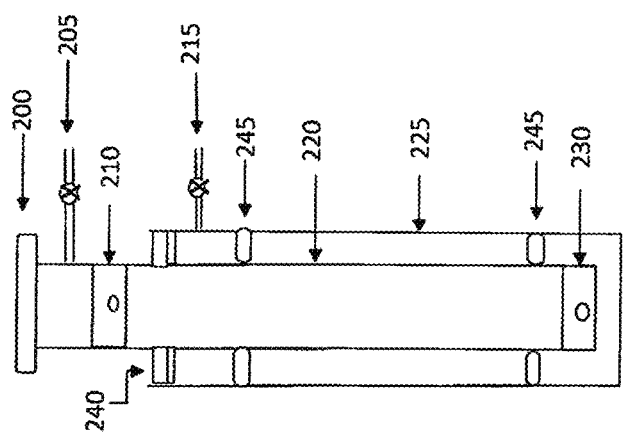
FIG. 8 is an alternative embodiment of the hydraulic system with floaters.

In an alternative embodiment the wind turbine system can be installed as shown in FIGS. 8 and 9. In this embodiment, the external casing (225) is implemented as in FIG. 4. The tower (220) casing joints (245) are connected and extend to the bottom of the external casing (225). Tower (220) can taper. A top float collar and a bottom float collar or check valves are installed (210 and 230), respectively. While in operation the tower (220) fluid density inside and the outside can be the same or different. The nacelle (200) is installed atop tower (220) to support and to isolate fluid circulation. Any wind directional adjustments are operationally handled at nacelle (200).

In operation, the blowout or casing striper (240) atop tower (220) is closed which allows fluid circulation between the tower (200) and the external casing (225). Firstly, high density fluid is injected at the top through the injection line (205). Light fluid is pumped out through the float collars and the wellhead ports (215). Secondly, low density fluid is injected at the top through the injection line (205). The heavy fluid inside the tower is displaced with light density fluid only. The light fluid can be gas such as air, nitrogen etc. The required upward force to raise the tower is a function of fluid density difference between the inside and outside of the tower as well as applied external pressure at the bottom. When the tower has reached to the desired elevation it is hung at well head using slips as depicted in FIG. 9.

The tower can be lowered to the bottom for servicing or maintenance by displacing or circulating out the light fluid inside the tower by similar density fluid as in the external casing.

Figure 10:
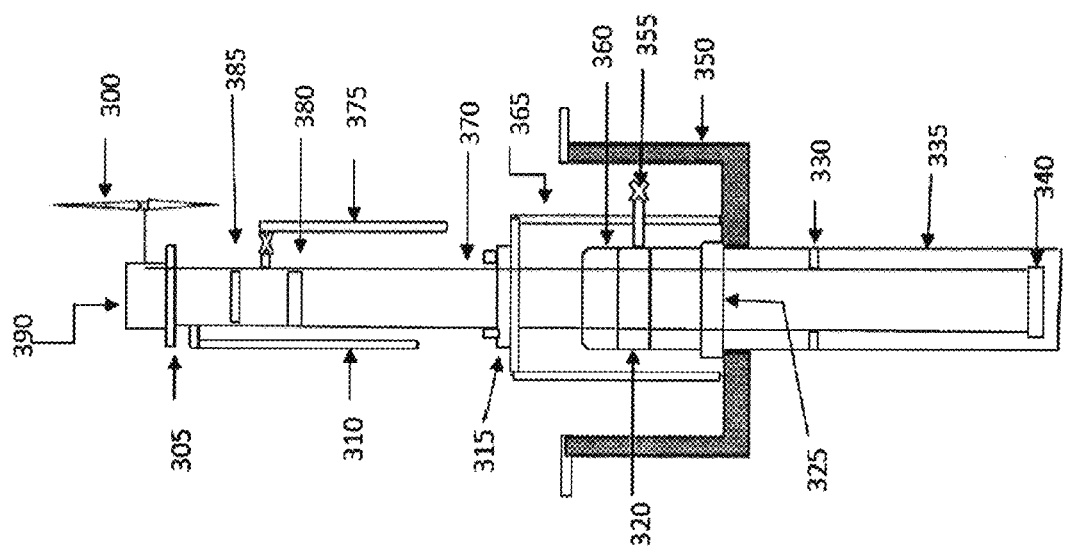
FIG. 10 illustrates an embodiment of the hydraulic system with a rotating upper tower.

In an alternative embodiment the wind turbine system can be installed as shown in FIG. 10. The external casing (335) is installed as in shown in FIGS. 8 and 9. The tower (370) has casing joints that are connected and extend from the top to the bottom of external casing. At the bottom and the top tower two float collars or check valves are installed (340 and 380). In operation, the tower's inside and outside fluid density inside can be the same or different. The nacelle (305) and top float collar (380) is isolated by a bridge plug (385). The tower is hung with slips (350) in a rotating table (315) located on the top of a substructure (365) supported by lower collar structure (325) disposed within slips (350). Any wind direction adjustments are handled by rotating pipe. Propeller (306) is attached to the top section (390) of nacelle (305).

In operation, the blowout or casing striper (360) is closed on the tower pipe to allow fluid circulation between inside the tower and the external casing. Initially, high density fluid is injected at the top through the injection line (375) and (310). At the lower end of the tower, light fluid is pumped out through the float collars and the wellhead ports (355). Secondly, low density fluid is injected at the top through the injection line (375). The heavy fluid inside the tower is displaced with light density fluid only. The light fluid can be gas such as air, nitrogen etc. The required upward force to raise the tower is a function of fluid density difference between the inside and outside of the tower as well as applied external pressure at the bottom of the tower. When the tower has reached to the desired elevation it is hung at the rotating table using slips. The wind turbine assembly of this embodiment can be operationally used with an air compressor, a hydraulic pump or an electric generator system.

In operation, the tower can be lowered to the bottom for servicing or maintenance by displacing or circulating out the light fluid inside the tower by similar density fluid as in the external casing. The external casings of the various embodiments can be existing abandoned or suspended wellbores such as dry holes, oil and gas wells which can be converted to be used in the wind turbine systems of the present invention. With these wind turbine systems, external casing is the upper segment of an abandoned or suspended wellbore that extends a length equivalent to receive and encompass the tower.

In alternative embodiments the length of the rotational blades can be adjusted in various ways. As depicted in FIG. 11, 12 each blade is segmented into a plurality of sections surrounding blade (500) attached to rotational shaft (570). Each upper section (515) has a larger diameter than its preceding section forming an interior cavity therein. As depicted in FIG. 12, to extend the length of the blade (510, 505), each lower section is extended from the interior cavity of the preceding section. As depicted in FIG. 11, to decrease the length of the blade (510, 505), each lower section is collapsed within the interior cavity of the upper section. Each segment is adjusted by vertically telescoping or collapsing each segment upon each other. In yet another embodiment depicted in FIGS. 13, 14 and 15 each segment (560) is adjusted by laterally telescoping or collapsing each segment upon each other. The rotational shaft (570) connects to base (565) which supports each segment (560).

Figure 17:
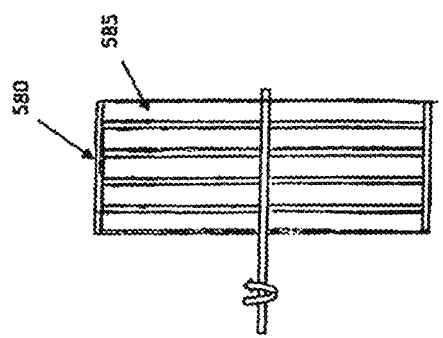
FIG. 17 is a side view of the circular blade.
Figure 16:
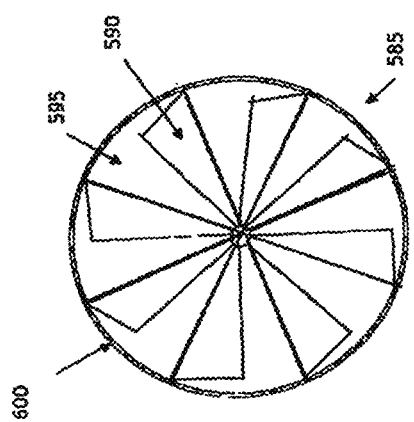
FIG. 16 front view of the circular blade.

In an alternative embodiment depicted in FIGS. 16 and 17, the blade is composed of a plurality of circular blades 585 with an equivalent diameter enclosed in a circular case 600. Each internal blade (590) is separated by an opened space (595). A rotational shaft laterally extends through the center of each blade (585) to support base (580).

What is claimed is:

1. A wind turbine system supported and operationally coupled to a plurality of rotational blades comprising:
   a power generator assembly for generating electricity installed at a ground level;
   a hollow cylindrical tubular tower extending above ground level defined by a top end and a lower end;
   a base disposed atop the top end of the tower to support a wind turbine assembly thereon;
   the wind turbine assembly for receiving a wind stream therein;
   the wind turbine assembly operationally coupled to a hydraulic tank;
   an umbilical cord attached to the tower and extending the length of the tower;
   the umbilical cord having an upper end operationally coupled to and in fluid communication with wind turbine assembly;
   the umbilical cord having a lower end operationally coupled to and in fluid communication with the power generator assembly for generating electricity therefrom;
   the wind turbine assembly having a mechanism for pumping hydraulic fluid from the hydraulic tank through the umbilical cord to the power generator assembly;
   the tower disposed within a wellbore located below the ground level;
   the wellbore having an external casing that extends a length to receive and encompass the tower;
   the top end and the lower end of the tower being closed wherein there is no fluid communication there between;
   a mechanism operationally coupled to the tower for raising and lowering the tower within the wellbore by injecting fluid therein;
   a top check valve operationally coupled to the top end of the tower;
   a lower check valve operationally coupled to the lower end of the tower wherein there is fluid communication between the tower and the wellbore thereby controlling the raising and lowering of the tower within the wellbore; and
   a port for injecting fluid within the tower wherein fluid differential between the tower and the wellbore controls the raising and lowering of the tower.

2. The wind turbine system of claim 1 wherein the power generator assembly further comprises a hydraulic motor operationally coupled to a power generator wherein the power generator rotational speed is controlled by the power generator.

3. The wind turbine system of claim 1 wherein the wind turbine assembly further comprises:
   a hydraulic pump operationally coupled to the plurality of rotational blades wherein the hydraulic fluid is transported into the umbilical cord.

4. The wind turbine system of claim 1 wherein the plurality of rotational blades are horizontally mounted to the wind turbine assembly.

5. The wind turbine system of claim 1 wherein the plurality of rotational blades are vertically mounted to the wind turbine assembly.

6. The wind turbine system of claim 1 wherein the tower is rotatably mounted near the wellbore allowing the tower to freely rotate in relation to the wind speed.

7. The wind turbine system of claim 1 wherein the wellbore is an upper segment of an existing abandoned oil and gas wellbore.

8. The wind turbine system of claim 1 wherein the wellbore is an upper segment of an existing suspended oil and gas wellbore.

9. The wind turbine system of claim 1 further comprises a plurality of wind blades rotationally and operationally coupled to the wind turbine assembly wherein each of the plurality of blades have a length that is telescopically adjusted.

10. The wind turbine system of claim 9 further comprises a plurality of wind blades rotationally and operationally coupled to the wind turbine assembly wherein each of the plurality of blades have a length that is laterally telescopically adjusted.

11. The wind turbine system of claim 1 further comprises a plurality of wind blades rotationally and operationally coupled to the wind turbine assembly wherein each of the plurality of blades have a length that is vertically telescopically adjusted.

* * * * *